Patented Sept. 12, 1950

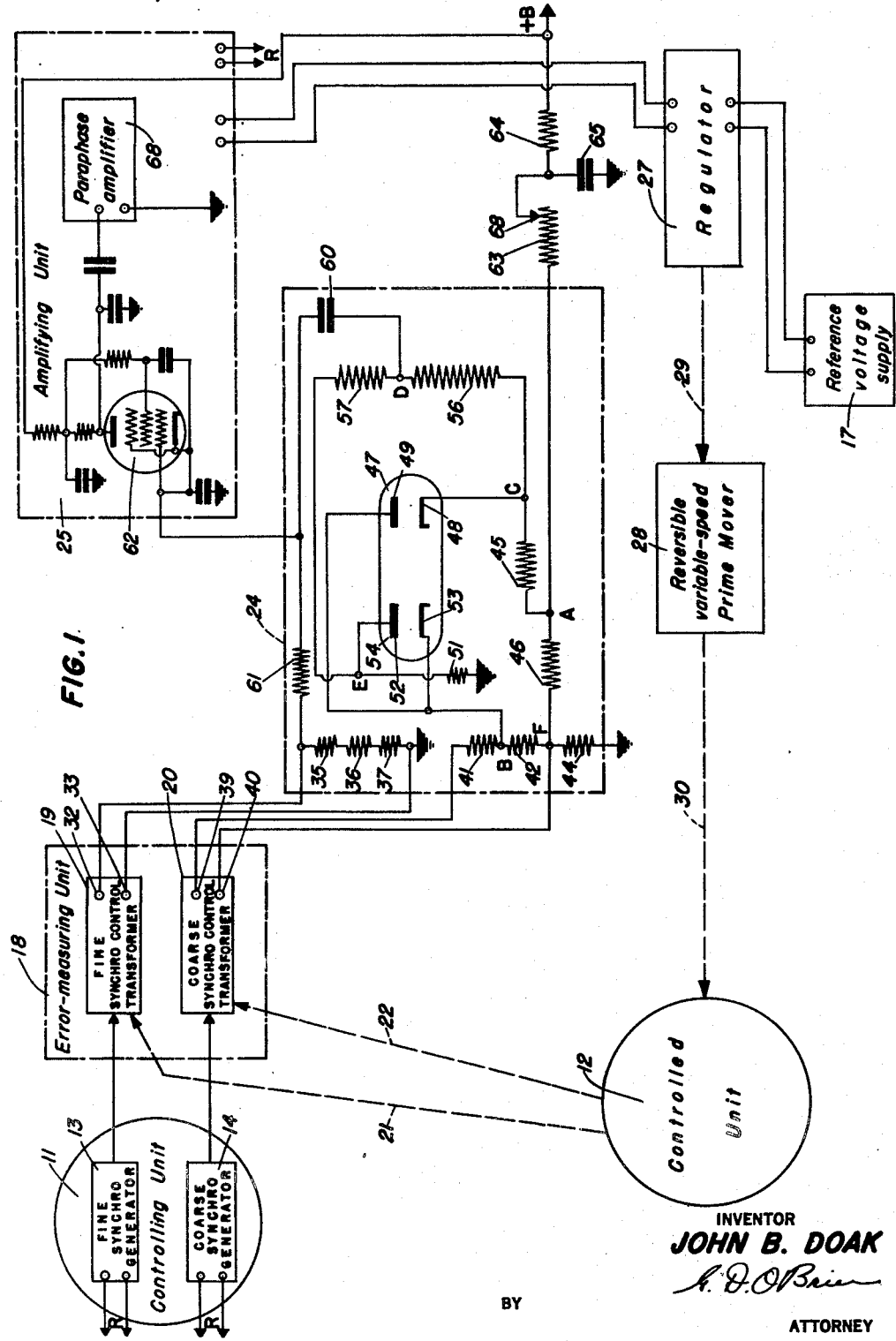

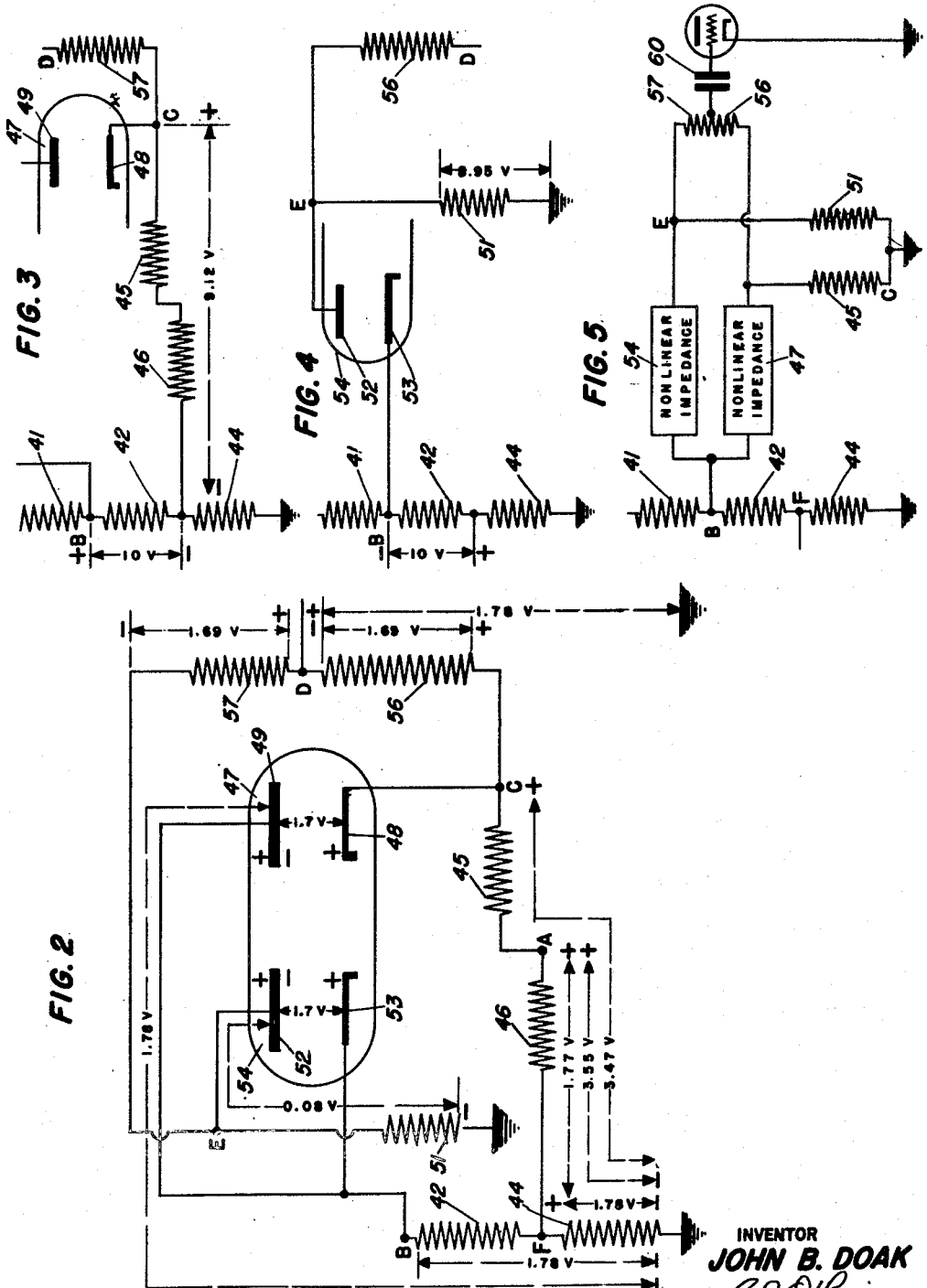

2,521,904

UNITED STATES PATENT OFFICE 2,521,904

CONTROL-TRANSFER CIRCUIT

John B. Doak, Silver Spring, Md., assignor to the United States of America as represented by the Secretary of the Navy Application March 5, 1946, Serial No. 652,197

1 Claim. (Cl. 318—30)

The present invention relates to control systems and specifically to a new and improved circuit arrangement for transferring dominating control from the fine control signal of a two-speed control system to the coarse signal when the deviation between the desired condition of a controlled member and the actual condition thereof attains a critical value, and for performing the reverse operation when the deviation is reduced to a lesser value. Although the invention has a wide range of prospective application, it is of particular utility as embodied in a continuous control system of the type employed in fire control for positioning guns and actuating computing devices. The invention is therefore described, for purposes of illustration but not of limitation, in that connection.

Continuous control systems of the closed cycle type and to which the invention is particularly applicable generally have the following principal components: (A) a controlling or ordering member; (B) a controlled or responding member; (C) a measuring instrument or detector for producing an error signal proportional to and in response to a deviation or departure of the actual position of the controlled member from the position ordered by the controlling member; (D) signal networks for amplifying that signal and/or modifying it in accordance with one or more functions of the deviation or departure, thereby to determine the characteristics of the control action desired; and (E) an arrangement controlled by the resultant modified and/or amplified error signal for positioning the controlled member in such manner as to eliminate the deviation or departure, thereby to bring the controlled member position into correspondence or synchronism with the position ordered by the controlling member.

Component E generally comprises an auxiliary source of power for moving the controlled member and regulating means responsive to the above-mentioned resultant signal for determining the rate and direction of application of power from that source to the controlled member. Elements D and E together constitute a follow-up or servo mechanism. Such a mechanism is essentially a power amplifying device in which the amplifier element or elements which drive the output are so actuated by the difference between input and output conditions that the output element is driven in such a direction as to make that difference approach zero. In a prior-art continuous control system which posed the problem solved by the present invention, a gun director is the controlling member. It includes a signal generating system for providing basic signals for actuating the servo mechanism. Specifically, it includes two synchro generators, so arranged that one revolution of the coarse generator rotor corresponds to 360° of angular motion of the director (in train, for example) and that one revolution of the fine generator rotor corresponds to 10° of such motion. These generators transmit electrical gun position order signals to a gun mount power drive. The drive comprises a servo mechanism and such operation that angular motion imparted to the generator rotors by the director results in angular motion of the gun corresponding in direction and displacement to the motion of the director.

The measuring instrument or detector conventionally comprises a 1-speed or coarse synchro control transformer and a 36-speed or fine synchro control transformer. The coarse synchro transformer has a restrained rotor geared to the mount of the controlled gun in such fashion as to make one rotation for 360° of gun motion and effectively to receive mechanical signals indicative of the actual position or response of the mount, and it also has a fixed stator electrically coupled to the coarse synchro generator stator in such fashion as to receive electrical signals indicative of director position and constituting position orders to the gun. The rotor of the fine synchro control transformer is similarly geared to the mount, so that it makes 36 complete turns for a 360° mount turn, and its stator is electrically coupled to the fine synchro generator stator. This measuring device compares order and response and produces error signals, each of a magnitude indicative and varying approximately as a linear function of the angular deviation or departure between director position and gun position (i. e. the difference between gun order and gun response). The error signals are amplified and modified in a signal translating network coupled to the measuring device and the resultant signals are employed in the remaining power drive or servo mechanism components to control a hydraulic-motor auxiliary power source. This motor so moves the gun as to eliminate the deviation or departure (that is, it effects synchronism or correspondence between the actual gun position and the ordered position). The networks and the last-mentioned components including the hydraulic motor constitute a follow-up system. When correspondence is attained the error signals are of zero magnitude. Near correspondence the coarse error signal is so weak that it alone cannot accurately control the gun. The system therefore suffers from backlash.

The two-speed system reduces undesired backlash. The reason for the two-speed system becomes evident upon consideration of the fact that the immediate function of the error signals is directional and speed control of a reversible electrical stroke motor or similar regulating device. The amount of torque developed by such a motor depends upon the magnitude of the current in a control winding thereof. Small deviations of the coarse synchro generator rotor and the coarse synchro transformer rotor from correspondence result in motor torques of insufficient strength to overcome the friction or inertia of the motor and the valve mechanism driven thereby. It is therefore necessary to employ a dual-signal vernier system whereby a small error between director and mount is accompanied not only by a minor displacement of a 1-speed or coarse synchro rotor but also by a major displacement of a 36-speed or fine synchro transformer rotor, with the result that when an error is introduced into the system there is initially developed by the reversible motor a greater starting torque for overcoming friction. Additionally, the gun is more rapidly brought into correspondence, since there is also finally applied to the stroke motor a greater stopping torque for overcoming inertia.

Viewing the problem in another way, at some point near synchronism the electrical signal output of the coarse transformer rotor is employed in balancing out friction. Let it be assumed that this point comes when the coarse synchro transformer rotor is about 36' away from synchronism. Friction thus causes an inaccuracy to be introduced into the system. One way to avoid this inaccuracy would be to have the coarse generator rotor make a large number of turns with respect to the mount. Let it be supposed, for example, that the quantity being transmitted is an angle which may have a value from 0° to 360°. If the generator and transformer make one turn for the full range of the signal, the response is accurate to the nearest 36'. If the gearing is so changed that the generator turns 36 times when the signal covers the range from 0° to 360°, then each complete turn of the synchro transformer would indicate a 10° change in the signal. When the transformer rotor is 36' from synchronism, the gun position is then only 1' from the correct position. High speed transmission permits a much more nearly accurate control from the same synchro system. Additionally, with a high speed system, only a small error is required to produce a large torque on the stroke motor included in the regulating system. However, high speed transmission is provided, not by substituting a 36-speed system for a 1-speed system but by combining both systems. The fine synchro system alone would tend to bring the controlled member into the nearest one of 36 different positions, spaced 10° apart, in response to a given signal from the controlling member. However, only one position of the controlled member is desired for a given position of the controlling member. The coarse system tends to accomplish this objective. Therefore it is essential to provide an arrangement which has such operation that the coarse synchro system exercises the dominating control function when the error is large and that the fine synchro system exercises such function when the error is small.

To clarify the nature of the problem solved by the invention let it be assumed that the maximum signal of the coarse transformer has an arbitrary value of 10 volts at 90° of error. At 5 minutes of error the coarse transformer output signal would approximate 0.014 volt. However, the fine control transformer would produce an output signal of 0.523 volt. These theoretical considerations are based on the premise that the transformer voltages vary sinusoidally with rotor displacement from zero position. In practice, however, the effective value of each of the transformer output signals varies approximately linearly for the small rotor displacements encountered under actual operating conditions. It is evident that under this condition the control of the system should be wholly exercised or at least dominated by the fine signal. However, if it be assumed that the error is 5 degrees, then the coarse signal would be 0.872 volt, while the fine signal would be 0 volt. It likewise becomes obvious that control should be exercised or dominated by the coarse transformer signal when the error is large. This conclusion is confirmed when it is considered that for an error of 5 degrees 10 minutes the signals are 0.901 volt coarse and $-1.045$ volts fine. If the control function were not dominated by the coarse transformer but were exercised equally by both transformers during the time of existence of a large error approaching 5°10', then at some value between 5° and 5°10', the combined signal constant of both transformers considered together would be 0 volts with the undesired result that the gun mount would tend to "synchronize" with the director at a false point, and the further undesired consequence that the transformers would be working against each other instead of cooperating to bring the mount into true correspondence. If the circuits were so arranged that the fine transformer alone controlled the mount, it would "synchronize" at one of a number of 10° spaced false points between 0 and 360° of error. Therefore it is necessary that, during the existence of large errors, dominant control of the signal networks following the measuring device and of the mount be exercised by the coarse transformer. The problem solved by the present invention is the efficient reliable transfer of the control function.

In accordance with one prior-art arrangement, there is provided in the measuring device a synchro motor, having a rotor electrically coupled to the same reference-voltage source as the synchro generator rotors and also having a stator electrically coupled in parallel with the coarse transformer stator and mechanically geared to the mount. Separate signal networks are individually coupled to outputs of the two transformers. When the deviation of the mount from the director reaches a critical value, the synchro motor operates a heart cam which cuts out the output signal of the fine signal network, thereby transferring control to the coarse transformer. When the deviation falls below this critical value, control is regained by the fine circuits. This prior-art arrangement is subject to serious limitations in that it involves a separate synchro motor and a complicated switching assembly consisting of contacts, a heart cam, a roller, a spring, an arm and a follower. These components are major production cost factors and sources of operating troubles and delays. It is desirable to provide a simple, reliable means for effecting the desired transfer of dominant control, in which such moving parts and attendant troubles are eliminated.

Representative of other proposals suggested for a partial solution of the transfer problem is an arrangement in which an electron tube is triggered by an error signal of the critical value applied to its control electrode. The tube plate current actuates a relay which short-circuits or otherwise disables a signal network coupled to the output of the fine transformer. A circuit of this type is disclosed in an article by Joseph J. McNaney, Electronics Magazine, pages 118–125, inclusive, December, 1944, volume 17, No. 12, New York. Such expedients suffer from the disadvantages inherent in relays, having moving parts which require careful adjustment and electrical contacts which are adversely affected by weather conditions. If the discharge current is also employed as a coarse output signal to control the power drive this expedient has the disadvantage that the coarse signal loses its relationship to angular error since the output of a discharge tube does not vary linearly with grid potential. The elimination of such relay and the preservation of this relationship would constitute a definite advance in the art and an approach to the attainment of a most important control system objective: reliability.

The above-described expedients are employed with systems in which separate signal networks are coupled to the coarse and fine transformer output circuits, since control transfer is effected by disabling the fine signal network. The first involves difficulties in that a limiter circuit must be provided to perform the sole function of limiting the value of the fine error signal at the point at which the coarse error signal takes control, and in that the control transfer is abrupt and rough. It is therefore desirable to provide an improved control transfer arrangement which involves no moving parts or contacts, which is readily adapted to couple a dual error-signal system either to a single signal translating network or to a conventional double network, and which is smooth in operation and does not require an additional limiting circuit for the performance of the above-mentioned sole function.

It is, accordingly, an object of the present invention to provide such a control transfer arrangement and thus to increase the effectiveness of the dual-signal measuring instrument in reducing the undesirable backlash of continuous control systems.

It is also an object of the present invention to avoid the disadvantages and limitations of gaseous discharge tube switching circuits: the chattering of relays, delays in initiating operation caused by the interval which must be permitted to elapse following the initiation of heating current and before the application of plate voltage to a gaseous discharge tube, tube failures due to high current, and the complications incident to the isolating of the heater power supply from ground.

Reference is made to an article appearing in the "Electronic Industries" Magazine for September, 1945, beginning at page 81, for a further discussion of the various expedients which are or have been proposed for preventing "synchronizing" at false points. This reference is made without prejudice to any rights which I may have to establish priority of my invention or to avoid such article as a reference against this case.

In accordance with my invention there is provided in a dual-signal control system of the type comprising a controlling member, a controlled member, means for producing a coarse electrical error signal having an effective value proportional to a function of the departure between the conditions of the controlling and controlled members, means for producing a fine electrical signal having an effective value proportional to a like function of a multiple of said departure, said signal producing means being so proportioned and arranged that the effective value of the produced fine signal is large with respect to that of the produced coarse signal when said departure is smaller than a predetermined magnitude and correcting means responsive to said signals for bringing said controlled member into correspondence with said controlling member, and a novel coupling arrangement for applying the coarse and fine signals from the signal-producing means to the correcting means. This arrangement includes a biased electronic tube for permitting the applied coarse signal to attain a value large with respect to the applied fine signal when the departure is at least equal to said predetermined magnitudes but for blocking the coarse signal from the correcting means when said departure is below said predetermined magnitude, whereby the fine signal exercises dominant control when the departure is smaller than said predetermined magnitude and the coarse signal exercises dominant control when the departure is at least equal to said predetermined magnitude.

For an understanding of the present invention, together with other and further objects thereof, reference is made to the following specification, to the claims appended thereto, and to the accompanying drawing in which:

Fig. 1 is a circuit schematic, partly in block form, of a continuous control system including a preferred form of control-transfer circuit in accordance with my invention;

Fig. 2 is a circuit schematic of the control-transfer arrangement illustrated in Fig. 1 and is furnished as an aid in explaining the operation of the invention during the time when the fine signal exercises dominant control;

Fig. 3 and Fig. 4 illustrate portions of the circuit of the control-transfer arrangement and are furnished as aids in explaining its operation during the time when the coarse signal exercises dominant control; and Fig. 5 is an electrically equivalent circuit diagram of portions of the control-transfer arrangement illustrated in Fig. 1.

Referring now specifically to Fig. 1 there is shown a complete control system embodying my invention in a particular form. The control system comprises a controlling unit 11 (which may be assumed to be a gun director) and a controlled unit 12 (which may be assumed to be a gun mount). An operator turns the controlling unit 11 and the system has such operation that the controlling unit electrically indicates to the controlled unit 12 the position which the latter should assume. When unit 12 has assumed such position, the synchro transmitters and receivers of controlling and controlled units are in synchronism or correspondence. To the end that unit 11 may transmit electrical orders to unit 12, there are provided two signal transmitting devices, one being a fine synchro generator 13 and the other being a coarse synchro generator 14. The rotors of generators 13 and 14 are electrically coupled to the output terminals of a reference voltage supply source 17 (as indicated by the letter "R"). The rotors of the synchro generators are turned by the controlling unit 11. The stators of units 13 and 14 are coupled to an error-measuring unit 18 and they transmit to the latter order signals indicative of the angular position which the controlled unit 12 is to assume. The rotor of the fine synchro generator 13 is so geared to the controlling unit 11 that it makes thirty-six turns for each turn of unit 11, while the rotor of generator 14 turns only once for each turn of unit 11.

The function of the error measuring unit 18 is to compare the electrical order signals from the controlling unit 11 and the mechanical response from the controlled unit 12 and to produce signals indicative of the deviation or error between order and response. Unit 18 therefore includes two error detectors or receivers: a fine synchro control transformer 19 and a coarse synchro control transformer 20. Units 19 and 20 have their rotors geared to the mount by any suitable system of gearing indicated by the dashed lines 21, 22. The rotor of unit 19 makes 36 turns for every turn of unit 12 and the rotor of unit 20 makes one turn for every turn of unit 12. The synchro transformers therefore effectively receive mechanical signals indicative of the actual position or response of the controlled unit 12. Units 19 and 20 have stators individually electrically coupled to the stators of generators 13 and 14, respectively, in order to produce electrical signals constituting position orders to the controlled unit. Unit 18 compares order and response and produces error signals, each of a magnitude indicative of and varying approximately as a linear function of the angular deviation or departure between desired position and actual controlled unit position. The output signals from the error-measuring unit are applied to an amplifying unit 25 through my novel control transfer circuit 24. My invention resides in unit 24 and in the novel and useful combinations which it makes possible. The purpose of unit 24 is effectively to block out the produced coarse error signal from amplifier 25 at the time when the proper operation of the system requires that the fine signal from unit 19 exercise dominant control. The signals translated from unit 18 are applied by unit 24 to amplifying unit 25 and are there amplified to a degree sufficient to permit them to control a regulator. The amplifying unit is not shown in detail since it is per se of the prior-art. The amplified control signal is applied to a suitable regulating unit 27 (for example, a stroke motor). The regulating unit controls the speed and direction of rotation of any suitable reversible variable-speed prime mover 28 through any appropriate system of shafting or coupling, or gearing, 29. Prime mover 28 is in turn geared to the controlled unit 12 by any appropriate expedient indicated by the dashed line 30. Mover 28 positions the controlled unit 12 in compliance with the order signals from the controlling unit 11. The operation of the control-transfer arrangement 24 and the correcting means comprising the amplifying unit 25, the regulating unit 27, mechanical expedients 29 and 30, mover 28, controlled unit 12 and mechanical expedients 21 and 22 is such that when correspondence is approached the rotors of transformers 19 and 20 are restored to the positions ordered by units 13 and 14 and the output error signals from units 19 and 20 are reduced to zero. Should the controlled unit overshoot the position of correspondence, the control signals would be of opposite phase or A. C. polarity and would restore correspondence. In order to make the system phase responsive, units 13, 14, 25 and 27 are coupled to the same source 17 of alternating current energy.

Referring now specifically to the details of the control transfer unit 24 it will be understood that its broadest function is to couple units 18 and 25. In the description of unit 24, circuit parameters found to be suitable in one practical embodiment are furnished by way of illustration and not of limitation. The fine signal channel proceeds from output terminals 32, 33 of transformer 19 to resistors 35, 36 and 37 (10,000 ohms total), the junction of resistor 37 and terminal 33 being grounded. Similarly, the coarse control signal channel proceeds from output terminals 39 and 40 of unit 20 to a series combination of resistors 41 and 42 (10,000 ohms and 5,000 ohms, respectively), the junction of resistor 42 and terminal 40 being grounded through a resistor 44 (1,000 ohms). The signal appearing across resistor 35, 36 and 37 is applied to the control electrode of the first tube 62 of the amplifier unit 25 through a resistor 61 (approximately 0.05 megohm). So far as the fine control signal is concerned, it is applied from unit 19 to unit 25 by a conventional resistance coupling network (35, 36, 37 and 61).

Coming now to the coarse signal channel: when the potential at terminal 39 is of positive polarity with respect to that at terminal 40, the junction of resistors 41 and 42 is positive with respect to ground and the signal across resistor 45 is applied to the input circuit of unit 25 by a network comprising resistor 45 (50,000 ohms), resistor 56 and condenser 60. To this end there is placed in shunt across resistor 42 a series combination of resistor 46 (1,000 ohms), resistor 45 and one-half 47 of a double-diode comprising cathode 48 and anode 49. When the potential at terminal 39 is negative with respect to that at terminal 40 the signal across resistor 51 (50,000 ohms) is impressed upon the input circuit of amplifying unit 25. For this purpose there is provided in shunt with resistor 42 a series combination of resistor 44 (1,000 ohms), resistor 51, and anode 52 and cathode 53 of the other half 54 of the double diode (6H6GT).

When diode 47 becomes conductive it effectually connects point B (the junction of resistors 41 and 42) to point C (the junction of resistors 56 and 45). The coarse signal then renders point D (the junction of resistors 56 and 57) more positive approximately by the amount of the signal-voltage drop in resistor 45. This potential is referred to ground.

On the other hand, when diode 54 becomes conductive point B is effectually connected to point E (the junction of resistors 51 and 57) and the signal-voltage drop across resistor 51 tends to render point D more negative with respect to ground. Points C and E are connected by a series combination of resistors 56 and 57 (each 1 megohm). Thus if the impedances of the tubes when in a conductive state are neglected, point B is effectually connected to point C through diode 47 when the signal is positive and to point E through diode 54 when the signal is negative. When the coarse signal is of a sufficiently large magnitude the signal between point D and ground is impressed on unit 25 by a coupling condenser 60 (0.01 microfarad), connected to the junction of resistors 56 and 57.

The other terminal of condenser 60 is connected to the control electrode of tube 62. However, when diodes 47 and 54 are non-conductive they present an infinite impedance between points B and E and between points B and C and the coarse signal is blocked off or uncoupled from the amplifier input. Thus the fine control signal is permitted to exercise dominant control until the coarse signal is of sufficient magnitude to render diodes 54 and 47 conductive.

A space current source (not shown) having a positive terminal +B supplies biasing potentials for the double diode and for tube 62. For biasing purposes, the junction of resistors 45 and 46 is coupled, through a series combination of resistors 63 and 64 (100,000 ohms and 50,000 ohms, respectively) to the high potential terminal of the source. Filtering is provided by the combination of resistor 64 and a filtering condenser 65 (0.5 microfarad).

Reference is made specifically to Figure 2 in explaining the method by which diodes 54 and 47 are initially biased to a non-conductive state. Current flow from the +B terminal through the path comprising resistors 45, 56, 57, 51, and ground tends to make anode 52 more positive than ground by the approximate amount of 0.08 volt. However, current flow in the alternate path from point A to ground through resistors 46 and 44, specifically that through resistor 44, tends to make point "B" and therefore cathode 53 more positive than ground by approximately 1.78 volts. Cathode 53 is therefore more positive than anode 52 and the net result is that said anode is effectively negatively biased with respect to the cathode by approximately 1.7 volts. Similarly, current flow through resistor 45 tends to make cathode 48 negative with respect to ground by the approximate amount of 0.08 volt. However, current flow in resistor 46 tends to make cathode 48 more positive than ground by the approximate amount of 1.77 volts. Therefore, anode 49 is effectively negatively biased by approximately 1.7 volts with respect to cathode 48. Diodes 47 and 54 become conductive substantially simultaneously as the coarse error signal takes control.

By varying the adjustment of the sliding tap 68 on resistor 63 and thus varying the voltage applied from the source +B the predetermined value of error signal which must be attained before the coarse system takes control can be altered within reasonable limits.

As the controlled unit approaches correspondence the diodes again become nonconductive and the fine error signal takes control.

Referring now to Figure 3 of the drawings let it be assumed that the alternating current coarse error signal is on its positive cycle and that a positive signal voltage of 10 volts is impressed by unit 20 across resistor 42. This voltage overcomes the bias impressed on diode 47 and the tube becomes conductive, so that, if the impedance of the tube in its conductive state be neglected, a positive voltage of approximately 9 volts is impressed on the amplifier input. On the other hand, during the negative portions of the signal-voltage cycle, the signal overcomes the bias on diode 54, as indicated in Figure 4, and a resultant signal voltage of approximately −9 volts is applied to the amplifier input. Unit 24 prevents the coarse control signal from dominating control action until diodes 47, 54 become conductive.

Figure 5 illustrates a circuit indicating the general principle upon which unit 24 is predicated. Diodes 47 and 54 are nonlinear impedances. Resistor 42 may be regarded as a signal source, since the signal causes a voltage drop therein. Unit 24 is essentially a switch.

The amplifying unit 25 comprises, as its input tube, a pentode which is arranged in a conventional manner. The signal output of this tube is balanced with respect to ground by applying it to a paraphase amplifier or phase inverter 69. The last-mentioned amplifier balances the signal voltage with respect to ground and renders it suitable for application to a push-pull amplifier. By suitable arrangements known to those skilled in the art and not forming a part of the present invention, the output signal of unit 25 is applied to regulator 27 which compares its phase with that of the reference voltage and determines the direction of movement of prime mover 28. The output signal ultimately causes the unit 12 to turn towards correspondence with the order from unit 11.

It will be understood that my improved control-transfer circuit is of equal utility in systems in which the control signals are applied to differentiating and damping circuits for the purposes of relating response to rate-of-change-of-error or damping.

While there has been shown and described what is at present considered to be a preferred embodiment of the invention, it will be obvious to those skilled in the art that various changes and modifications may be made therein without departing from the true scope of the invention and it is, accordingly, intended in the appended claim to cover also all such changes and modifications.

I claim:

An electrical control circuit for feeding either one of two control signals to a controlled unit, comprising a translating circuit coupled to the input side of said controlled unit for coupling the source of one of said control signals thereto, and a switching circuit coupled to the input side of said controlled unit, said switching circuit comprising a pair of series circuits, each of which includes a high vacuum thermionic diode, constituting a non-linear, unidirectionally conducting device, in series with a plurality of linear impedance elements, one of said linear impedance elements being common to both circuits of said pair of series circuits, said diodes being connected in opposite senses in the circuit so as to conduct during alternate half cycles of said applied control signal and being initially biased to conduct only when said applied signal attains a predetermined amplitude.

JOHN B. DOAK.

REFERENCES CITED

The following references are of record in the file of this patent:

UNITED STATES PATENTS

| Number | Name | Date |
|---|---|---|
| 2,407,876 | Godet | Sept. 17, 1946 |
| 2,408,068 | Hull et al. | Sept. 24, 1946 |
| 2,409,970 | Agins | Oct. 22, 1946 |
| 2,446,532 | Edwards | Aug. 10, 1948 |
| 2,455,364 | Hays | Dec. 7, 1948 |
| 2,464,566 | Ferrell | Mar. 15, 1949 |